United States Patent
Stachowiak et al.

(12) 
(10) Patent No.: US 6,212,004 B1
(45) Date of Patent: Apr. 3, 2001

(54) REFLECTOR WITH DIRECTIONAL CONTROL OF VISIBLE AND INFRA-RED RADIATION

(75) Inventors: Grzegorz Stachowiak, Rochester; Robert G. Naum, Pittsford, both of NY (US)

(73) Assignee: Applied Coatings, Inc., Rochester, NY (US)

(*) Notice: Subject to any disclaimer, the term of this patent is extended or adjusted under 35 U.S.C. 154(b) by 0 days.

(21) Appl. No.: 09/410,924

(22) Filed: Oct. 1, 1999

Related U.S. Application Data

(63) Continuation of application No. 08/853,225, filed on May 8, 1997, now abandoned.
(60) Provisional application No. 60/017,472, filed on May 10, 1996.

(51) Int. Cl.[7] .................. G02B 5/22; G02B 5/28; F21V 9/00; F21V 7/22
(52) U.S. Cl. .......... 359/360; 359/585; 359/589; 362/293; 313/113
(58) Field of Search .................. 359/359, 360, 359/584, 585, 589, 590, 586; 362/166, 293; 313/113

(56) References Cited

U.S. PATENT DOCUMENTS

| | | |
|---|---|---|
| 3,645,600 | 2/1972 | Doctoroff et al. . |
| 3,645,601 | 2/1972 | Doctoroff et al. . |
| 3,660,137 * | 5/1972 | Furuuchi et al. .................. 359/360 |
| 3,745,325 * | 7/1973 | Harvey .............................. 359/359 |
| 3,769,503 | 10/1973 | Kim . |
| 3,806,236 | 4/1974 | Downing . |
| 3,944,320 | 3/1976 | McLintic . |
| 3,976,890 | 8/1976 | Barnes, Jr. et al. . |
| 4,106,859 | 8/1978 | Doriquzzi et al. . |
| 4,227,113 | 10/1980 | Walsh . |
| 4,254,455 | 3/1981 | Neal, Jr. . |
| 4,287,266 | 9/1981 | Myles . |
| 4,306,762 | 12/1981 | Yamashita et al. . |
| 4,446,397 | 5/1984 | Johnson et al. . |
| 4,459,618 | 7/1984 | Nodov . |
| 4,467,238 | 8/1984 | Silverstein et al. . |
| 4,573,156 | 2/1986 | Anthony et al. . |
| 4,664,470 | 5/1987 | Yerazunis . |
| 4,707,632 | 11/1987 | Walsh . |
| 4,935,660 | 6/1990 | Heider et al. . |
| 5,093,601 * | 3/1992 | Watanabe et al. .................... 313/113 |
| 5,114,818 | 5/1992 | Yu . |
| 5,140,457 * | 8/1992 | Letter .................................. 359/585 |
| 5,143,445 | 9/1992 | Bateman et al. . |
| 5,168,193 | 12/1992 | Hoegler . |
| 5,169,229 * | 12/1992 | Hoppert et al. ...................... 362/293 |
| 5,177,396 * | 1/1993 | Gielen et al. ........................ 359/385 |
| 5,178,712 | 1/1993 | Sakai et al. . |

(List continued on next page.)

Primary Examiner—Jon Henry
(74) Attorney, Agent, or Firm—Eugene Stephens & Associates

(57) ABSTRACT

A reflector providing directional control of visible and infra-red radiation emanating from a lamp held within the reflector. The reflector includes a first, optical interference coating applied to the interior surface of the dome-shaped portion of the reflector which is operable to transmit infra-red radiation while reflecting visible light. A second coating which is non-transmissive to IR radiation is applied to selected portions of the reflector body, and preferably to the area adjacent the neck portion of the reflector whereby components placed rearwardly of the reflector are protected from IR radiation. Various application techniques are disclosed, and the second coating may be applied in manners allowing for coding of reflectors of different types, as well as creating an aesthetically pleasing effect on surfaces illuminated by the IR radiation transmitted rearwardly of the reflector. Visible light escaping from the neck portion of prior art reflectors is also addressed by the present invention.

43 Claims, 5 Drawing Sheets

U.S. PATENT DOCUMENTS

| | | |
|---|---|---|
| 5,235,462 | 8/1993 | Bidermann . |
| 5,236,511 | 8/1993 | Etzkorn et al. . |
| 5,243,402 | 9/1993 | Weber et al. . |
| 5,257,140 | 10/1993 | Rogers . |
| 5,300,487 | 4/1994 | Hed . |
| 5,339,198 | 8/1994 | Wheatly et al. . |
| 5,367,444 | 11/1994 | Bornhorst et al. . |
| 5,372,874 * | 12/1994 | Dickey et al. ............ 359/586 |
| 5,412,274 * | 5/1995 | Parham ................ 359/586 |
| 5,514,454 * | 5/1996 | Boire et al. ............ 359/586 |
| 5,521,765 * | 5/1996 | Wolfe ................ 359/586 |
| 5,688,585 * | 11/1997 | Lingle et al. ............ 359/586 |

* cited by examiner

REFLECTOR WITH DIRECTIONAL CONTROL OF VISIBLE AND INFRA-RED RADIATION

RELATED APPLICATIONS

This application is a Continuation application of parent application Ser. No. 08/853,225, filed May 8, 1997, by Grzegorz Stachowiak and Robert G. Naum, entitled REFLECTOR WITH DIRECTIONAL CONTROL OF VISIBLE AND INFRA-RED RADIATION now abandoned. This parent application is based on Provisional Application No. 60/017,472, filed May 10, 1996, by the same inventors, entitled REFLECTOR WITH DIRECTIONAL CONTROL OF VISIBLE AND INFRA-RED RADIATION. All prior related applications are hereby incorporated by reference.

BACKGROUND OF THE INVENTION

The present invention broadly relates to light reflectors having thin film coatings applied thereto for selective reflectance and transmission of different portions of the electromagnetic spectrum radiating from a source. The present invention more particularly relates to such reflectors having plural coatings with different reflectance/transmittance properties across the electromagnetic spectrum, the different coatings being applied to different, pre-selected portions of the reflector, respectively.

Light reflectors come in a variety of types and configurations. A common reflector configuration comprises a generally dome-shaped reflecting portion with a rearwardly extending neck portion wherein a lamp (typically of the incandescent or halogen type) is secured for radiating light forwardly of the reflector body. The reflector body may be made totally reflecting, wherein substantially all of the electromagnetic spectrum emitted by the lamp is reflected forwardly, or it can be of the "cold-mirror" type wherein an optical interference coating is applied to a transparent reflector body (typically glass) with the interference coating acting as a light filter to reflect most of the visible light of the spectrum while transmitting most of the infra-red component thereof (hereinafter "IR") through the transparent reflector body. Since the IR component is the source of heat in the electromagnetic spectrum, the visible light reflected forward is considered "cold" light which is desirable in many reflector applications.

Certain drawbacks have been identified with cold mirror reflectors, the most prominent of which is the uncontrolled transmission of IR radiation through the reflector body which may cause damage by over-heating of components positioned rearwardly of the reflector body (e.g., transformers and plugs). Another feature of the cold mirror reflector which many find objectionable is the escape of visible light through the end portion of the neck, the internal cavity of which is a difficult area to coat with typical techniques used for applying thin films to reflector bodies (e.g., evaporation and sputtering in a vacuum). The visual attractiveness of the reflector itself and the illumination pattern it creates in the surrounding area are also concerns, as well as being able to coat the reflectors in an efficient, in-line process.

SUMMARY OF THE INVENTION

The present invention addresses the above concerns by providing a cold-mirror reflector with directional control of the IR portion of the electromagnetic spectrum emanating from a lamp positioned inside the reflector body. A significant benefit of the invention is protection from over-heating of components placed rearwardly of the reflector which would otherwise occur due to IR radiation passing through the reflector. Another benefit of the invention is the ability to eliminate the escape of visible light through the neck portion of a reflector body. Additional benefits provided by the present invention include the ability to code different reflector types, as well as improve aesthetics of the reflector including the area which it illuminates.

Directional control of IR radiation of a lamp held in a reflector body is accomplished by the present invention by applying plural coatings having different IR reflectance/transmittance ratios to different, pre-selected areas of the reflector body. More particularly, a first optical interference coating is applied to the inside surface of the main body portion of the reflector. At this stage, the reflector is acting as a prior art cold-mirror reflector which reflects visible light while transmitting IR radiation therethrough. A second coating which is not IR transmissive i.e., it is IR reflecting and/or IR absorbing) is then applied to selected areas of the reflector body. It is noted that IR-reflective materials are preferred over IR-absorbing materials due to concerns of overheating of the reflector substrate which may occur with IR-absorbing materials. The areas coated with the second coating may be on the interior and/or exterior surfaces of the reflector body.

All or part of the neck portion may be coated with the second coating to prevent visible light (as well as most IR light) from escaping therethrough. This may be done with or without applying the second coating to other parts of the reflector body. The application techniques discussed in the Detailed Description section below allow easy application of this second coating to preselected areas of the interior and/or exterior surfaces of the neck portion and/or main body portion of the reflector in an efficient and aesthetically pleasing manner.

Since only the second coating is not IR transmissive, the percentage, direction and area of IR radiation transmitted rearwardly of the reflector body is defined by the dimensional area of the reflector body coated with the second coating. The ratio of IR radiation being transmitted to that being absorbed and/or reflected may therefore be varied by changing the dimensional area covered with the second coating, thereby allowing the specific "heat-management" provided by the reflector to be defined and precisely controlled by the manufacturer as desired. That is to say, the amount of IR radiation transmitted to that being reflected and/or absorbed by the reflector may vary according to need, and a certain amount of IR radiation reflected forward is tolerable in most applications where cold mirrors are used. The present invention addresses this by allowing a wide variety of IR transmittance/reflectance ratios, in addition to allowing control of the area and direction over which the IR radiation is not transmitted ("blocked") by the reflector.

As mentioned above, the invention also provides means by which different types of reflectors can be coded so as to be readily visually distinguishable by the manufacturer and/or consumer. For example, the second coating of non-IR transmissive material may itself be colored by using a metal nitride, colored metal, metal alloy or other colored material as the second coating, or by applying a colored coating (e.g., metal nitride) as a separate (third) layer in a manner ensuring that the colored coating is readily visually noticeable. As will be explained more particularly below, this third separate layer may be applied on the external or internal surface of the reflector body independently of where the second coating is applied. Hence, this color-coding of the reflector may be used to visually identify and distinguish predetermined reflector characteristics (e.g., brand, beam angle, wattage, etc.) with either a color-identifying machine in a manufacturing line, or the human eye.

The second coating may also be applied in specific patterns on the reflector, e.g., in concentric rings adjacent the neck portion of the reflector, which not only serve to prevent a certain percentage of IR radiation from being transmitted through and behind the reflector body, but also provide a visually pleasing pattern on a surface located rearwardly of the reflector (e.g., a ceiling) by the residual visible radiation which passes through those areas of the reflector body which do not have the second coating applied thereto. The residual light of a cold mirror is typically colored which even further enhances the visual effect on the illuminated surface.

DETAILED DESCRIPTION

Figure 1:
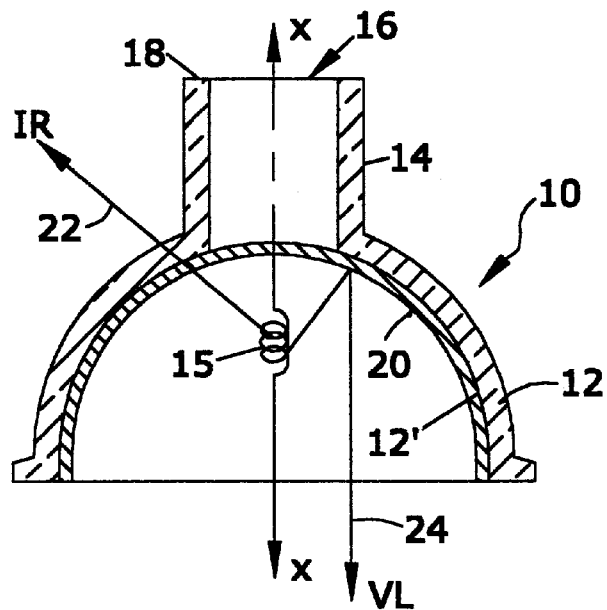
FIG. 1 is a cross-sectional, elevational view of a prior art cold-mirror reflector.

Referring now to the drawings, there is seen in the Figures a reflector 10,26 made of transparent material such as glass, for example. Reflector 10,26 has a main, generally dome-shaped (typically elliptical or parabolic) reflecting portion 12 with a rearwardly extending neck portion 14 wherein a lamp (not shown) having a filament 15 is securely positioned to lie along (an axially extending filament) or intersect (a radially extending filament) the central longitudinal axis x—x of reflector 10,26. (It is noted only a filament of a lamp is shown in the drawing for the sake of clarity). The lamp is positioned in the reflector such that the electrical connectors of the lamp extend through an aperture 16 provided at the end wall 18 of neck portion 14, with a cement being typically used to secure this end of the lamp in neck portion 14. It is understood that the reflector configuration herein described is for purposes of description only, and the present invention is therefore applicable to any reflector configuration, with or without a neck portion.

In a prior art cold-mirror reflector as depicted in FIG. 1, an optical interference coating 20 is applied to the interior surface 12' of the dome-shaped portion of the reflector body. Cold mirror reflectors made with optical interference coatings are well known in the art and comprise multiple layers (typically 20 or more) of materials of alternating high and low indices of refraction. Some common examples of high index of refraction materials used in optical interference coatings are ZnS, $TiO_2$, $Ta_2O_5$, and some common examples of low index of refraction materials used in optical interference coatings are $SiO_2$, $MgF_2$, and $Al_2O_3$. The optical interference coating operates as a "light filter" by allowing certain wavelengths of the electromagnetic spectrum to pass through the interference coating 20 and transparent reflector body (i.e., those in the IR range, represented by directional arrow 22), while reflecting other wavelengths of the spectrum forwardly of the coating 20 (i.e., those in the visible light ("VL") range, represented by directional arrow 24). Since IR radiation is transmitted rearwardly of the reflector body, the heat generated thereby may damage whatever components are positioned directly behind the reflector body. Also, since it is very difficult to coat the internal cavity of the neck portion 14 with interference coating 20 using typical coating techniques, visible light 24 (as well as IR radiation 22) may pass therethrough which many find undesirable.

Figure 2:
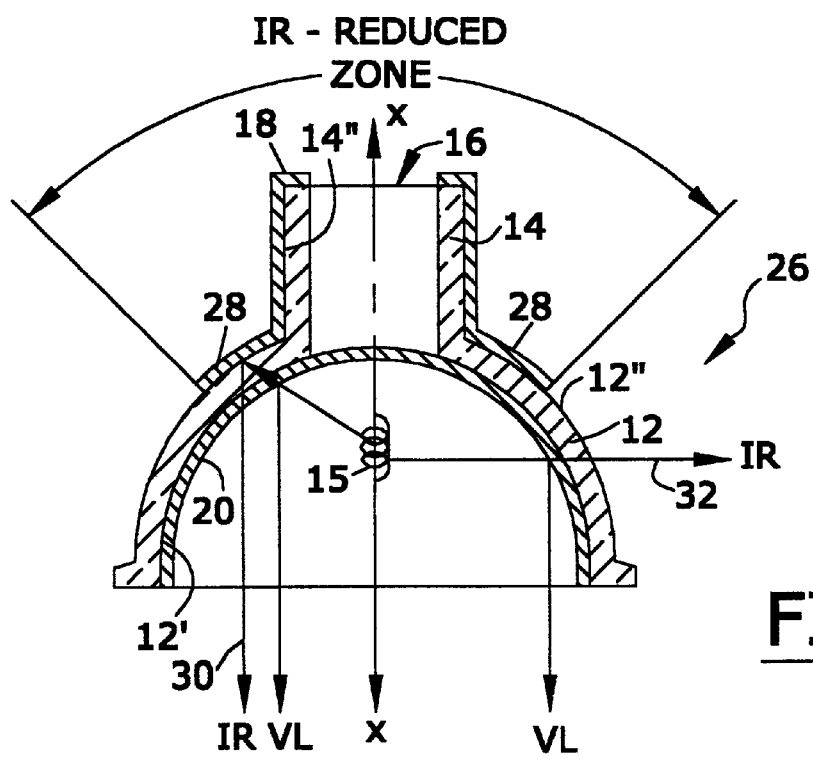
FIG. 2 is a cross-sectional, elevational view showing a first embodiment of the invention.

Referring to a first embodiment of the invention seen in FIG. 2, a dome-shaped reflector 26 is provided having the same interference coating 20 applied to the inner surface 12' of dome-shaped portion 12. A second coating 28 is applied to reflector 26 at the exterior surface of neck portion 14, as well as a portion of exterior surface 12" of dome-shaped portion 12.

In all the embodiments of the invention, second coating 28 is substantially nontransmissive in the IR range of the electromagnetic spectrum, and may be of a material which is IR-reflecting and/or absorbing, with IR-reflecting materials being preferred over IR-absorbing materials due to concerns of over-heating of the reflector substrate with IR absorbing materials. As will be described more fully below, materials for coating 28 may be selected from metals, semiconductors, transparent conductive coatings (e.g., Indium Tin Oxide or "ITO"), nitrides, and oxides. Further, second coating 28 itself may be formed of single or multiple layers of such materials.

Still referring to the embodiment of FIG. 2, since first coating 20 is IR-transmissive while second coating 28 substantially prevents transmission of IR radiation therethrough, what may be called an "IR-Reduced Zone" is defined rearwardly of the reflector 26 as indicated by the arced arrows. As such, components positioned within the area of this zone will not be damaged by the heat of IR radiation emanating from filament 15. The size of the IR-Reduced zone may be increased or decreased by increasing or decreasing the area of the reflector body to which second coating 28 is applied. Thus, reflectors having different IR-Reduced zone sizes may be provided to accommodate different sizes of components placed rearwardly of the reflector body.

As mentioned above, it is preferred that second coating 28 be IR-reflecting whereby IR radiation is reflected forwardly of the reflector body as indicated by arrow 30. Alternatively, it may be partially or fully IR-absorbing although consideration must be given to the possibility of over-heating of the reflector substrate. If an IR-reflective coating 28 is used, the amount of IR radiation being reflected forwardly to that being transmitted through the reflector body may be precisely controlled through selection of the area of surface 12" being covered by second coating 28. In the embodiment of FIG. 2, the area of surface 12" covered by coating 28 is small enough such that the amount of heat being reflected forwardly with the visible light is not a concern in most "cold-mirror" applications in that the majority of IR radiation emanating from filament 15 is transmitted through the area of reflector wall 12 covered solely by first coating 20 (see arrow 32). Since components of which over-heating is a concern are normally positioned only rearwardly of the neck portion 14, the IR radiation being transmitted at 32 is not a problem in most reflector applications. Also, if the purposes for which the reflector is to be used cannot tolerate any IR radiation forwardly of the reflector, only neck portion 14 may be covered with second coating 28, wherein the amount of IR radiation being reflected forwardly is so minimal as to not be a concern. In this instance, it will be appreciated that substantially all visible light is stopped from escaping through neck portion 14 due to the application of second coating 28 to the neck portion 14. In this regard, it is noted that although coating 28 is shown in FIG. 2 as covering substantially the entire exterior surface 14" of neck portion 14, the cement used to secure the lamp in the reflector body (not shown) also acts to prevent light from escaping through those areas covered by the cement. Thus, coating 28 need only cover those areas of neck 14 not covered by the cement to be effective at preventing substantially all visible light from escaping through the neck portion 14 (see FIGS. 3 and 5).

It is furthermore noted that some users may not require that neck portion 14 be coated with either optical interference coating 20 or second coating 28. That is to say, use of second coating 28 solely on portion 12 may be sufficient to accommodate the heat management goals of some users, and the escape of any visible light through the neck portion may not be a concern.

Figure 3:
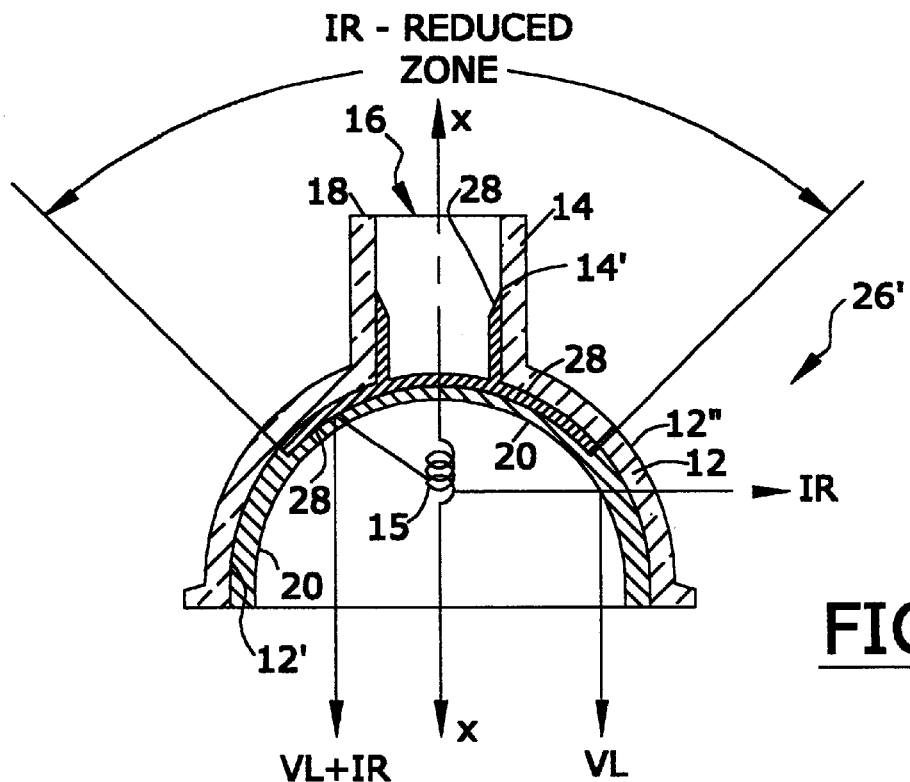
FIG. 3 is a cross-sectional, elevational view showing a second embodiment of the invention.

Referring to FIG. 3, a second embodiment of the invention is shown which has substantially the same IR-transmissive/reflective ratio as the embodiment of FIG. 2, but wherein second coating 28 is instead applied to a portion of the interior surface 14' of neck portion 14, as well as a portion of interior surface 12' adjacent neck portion 14. In this embodiment, it is preferred that second coating 28 be applied first, underneath first coating 20 which is subsequently applied and therefore acts to protect second coating 28 from environmental degradation. In this regard, it is noted the non-IR transmissive materials from which second coating 28 is formed (examples of which were given above, and especially metals such as Al and Ag), are generally more susceptible to environmental degradation such as oxidation, than is an optical interference coating. For example, aluminum is a broad band reflective metal (including the IR band) used in many reflector applications, but can break down at the molecular level and form aluminum oxides or nitrides under elevated temperatures (e.g., >300° C.) which inevitably reduce its reflective properties. Also, as noted with the embodiment of FIG. 2, second coating 28 may be applied solely to all or part of the interior surface 14" of neck 14, or solely to the interior surface 12', depending on the needs of the user The portion of interior neck surface 14' not coated with second coating 28 is where the cement is typically applied to secure the lamp in the reflector, thereby negating the need for second coating 28 in that location as explained above.

Figure 4:
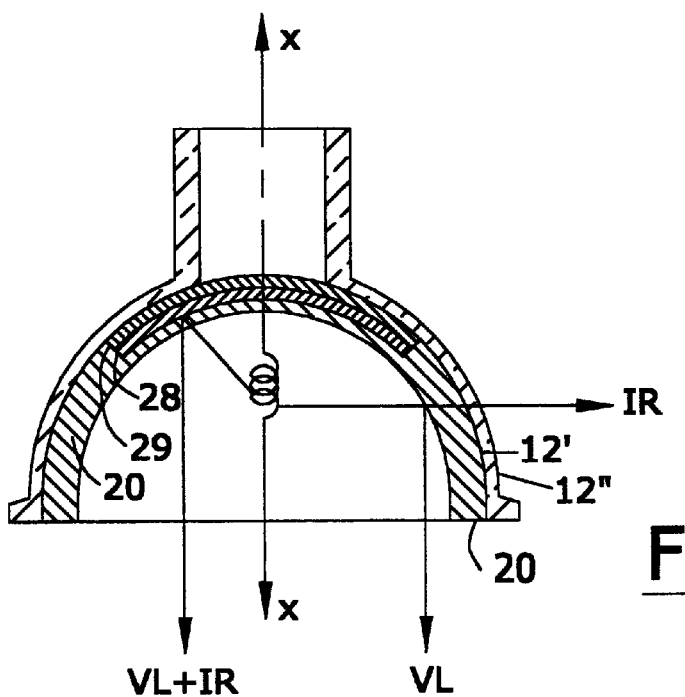
FIG. 4 is a cross-sectional, elevational view showing a third embodiment of the invention.
Figure 5:
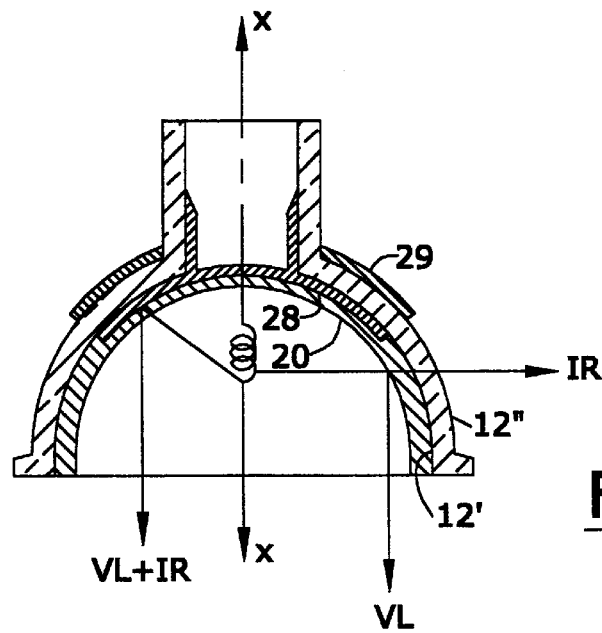
FIG. 5 is a cross-sectional, elevational view showing a fourth embodiment of the invention.

FIGS. 4 and 5 show third and fourth embodiments of alternate applications of a third color coating 29 to the reflector of FIG. 3 where the second coating 28 is applied to the interior surface 12' of the reflector body 12. A color coating may be desired for coding the reflector's properties or as a trademark, for example. Possible materials from which color coating 29 may be selected are described below, it being noted that second coating 28 itself may be colored as described below in all embodiments of the invention, thereby negating the need for a separate color coating 29 in that instance. In FIG. 4, the third color coating 29 is applied first, directly onto surface 12' beneath second coating 28 which is then followed by deposition of optical interference coating 20 over the entire surface. In this manner, the color of coating 29 is directly observable through the transparent body of the reflector from the outside. In FIG. 5, third color coating 29 is instead applied to the exterior surface 12" of the reflector body, which is also of course directly observable from the outside. It is noted that in both embodiments, the third color coating does not interfere or in any way affect the reflectance properties of the reflector as are defined by optical interference coating 20 and non-IR transmissive coating 28. Also, although not shown in the embodiment of FIG. 2, a color coating 29 may be applied directly over second coating 28 which is of course directly observable and will not interfere with the reflectance/transmissive properties of second coating 28.

Figure 6:
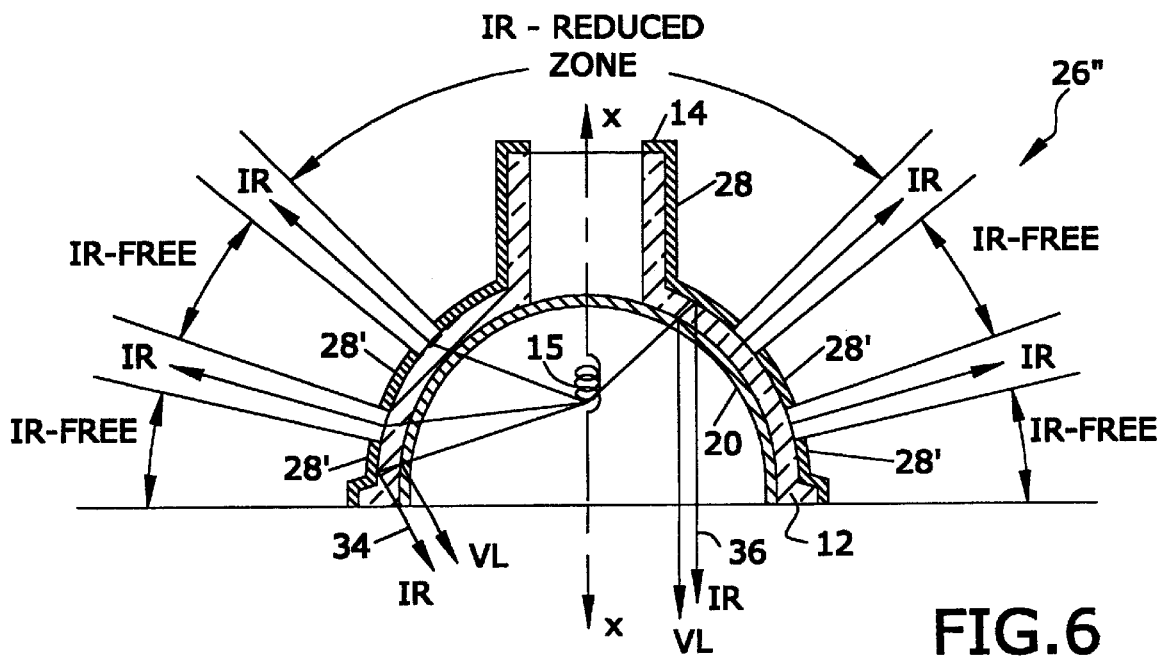
FIG. 6 is a cross-sectional, elevational view showing a fifth embodiment of the invention.

A fifth embodiment of the invention is depicted in FIG. 6 wherein second coating 28 is applied to create a pleasing visual effect on a surface illuminated by the residual IR radiation transmitted throughout the reflector body, in addition to achieving a desired IR transmission/reflectance ratio. More particularly, second coating 28 is applied to the exterior surfaces of neck portion 14 as in FIG. 2, and additionally is applied in concentric rings 28' about the exterior surface 12" of dome-shaped portion 12. As such, a series of concentric IR-Reduced zones is created completely around the reflector body as indicated by the arced arrows, with IR radiation being reflected, such as at 34 and 36, by those areas covered by second coating 28, 28', and IR radiation and residual light being transmitted through the reflector in those areas in-between. This design provides for a more even distribution of IR-reflected radiation across the reflector body than with the embodiments of FIGS. 2 and 3, with the IR reflectance/transmittance ratio being variable by varying the size and spacing of the concentric rings 28'. This design further provides an aesthetically pleasing pattern on a surface located rearwardly of the reflector (e.g., a ceiling) by the residual visible radiation which is transmitted through the reflector body in those areas not covered by second coating 28. It is of course understood that designs other than that shown in FIG. 6 are possible to achieve the desired visual effect. For example, second coating 28 may be applied in dots, circles, stripes, etc., the design thus created being limited only by one's imagination.

Any non-IR transmissive material may be used to produce second coating 28, 28'. As previously mentioned, IR-reflecting materials are preferred over IR-absorbing materials. Absorbing materials will collect heat which may lead to coating and/or substrate failure, and also partly re-radiate that energy both forward and rearwards. If it is desired to also block visible light in the neck area, then materials which block both visible light and IR are preferred. Good candidates for coating 28 are metals since they are reflective in the IR range, easy to deposit, and relatively durable. Aluminum and silver are attractive candidates due to easy fabrication and the attractive, white color matching to that of the interference coating 20. Chromium may be considered when improved durability is desired. Semiconductors, silicon in particular, and transparent conductive coatings such as Indium Tin Oxide (ITO) are also very good candidates for second coating 28, 28'.

Metal nitrides, some oxides and their mixtures are also attractive candidates for second coating 28, 28', especially for decorative and coding purposes. Reflectors with metal coatings, especially on the external surfaces, may be more appealing as a colored coating. Besides being decorative, the color of second layer 28 may be used to indicate beam angle, power or other predetermined properties of the reflector. The color may also be used as a trademark. Sputtered metal nitrides are well-known, durable color coatings. They are typically partially reflective and partially absorbing. Titanium, chromium, aluminum and boron nitrides are particularly good candidates for second coating 28, 28'. Both nitrides and oxides may be used alone as second coating 28,28', or as an additional protective and/or decorative coating 29 as seen in FIGS. 4 and 5. Thus, IR blocking coating 28,28' may comprise a metal, and the nitride/oxide of that metal or a different metal may be applied either in the same application process or multiple application processes. A few good candidates for a multi-layer second coating 28 and color coating 29 which comprises a metal with a colored metal nitride top layer, respectively, are Al\TiN, Ti\TiN and Cr\CrN. The Ti/TiN and Cr/CrN metal/metal nitride combinations could be deposited in a single process as explained below, thus making it an efficient deposition process.

Although a variety of deposition techniques may be used to apply the second coating 28, 28', the preferred method is sputtering in a vacuum. Sputtering is a relatively high pressure vacuum technique which assures sufficient coverage of hard-to-reach surfaces (e.g., the internal surfaces of neck portion 14) due to the effect of gas scattering. It is a popular technique used to deposit metals and nitrides in the industry, and may also be used to deposit oxides. Nitrides and oxides are deposited reactively with nitrogen or oxygen, respectively, being added to the neutral gas process wherein deposited particles react chemically with reactive gas. Sputtering is a technique suitable for high volume, in-line systems. Metals, nitrides and oxides may be produced in sequence in the same system/operation. Sputtering in-line systems are extremely cost effective for single or few layer coatings such as metal or metal nitride layers and a metal layer with nitride or oxide used as a protective/decorative layer.

Figure 7:
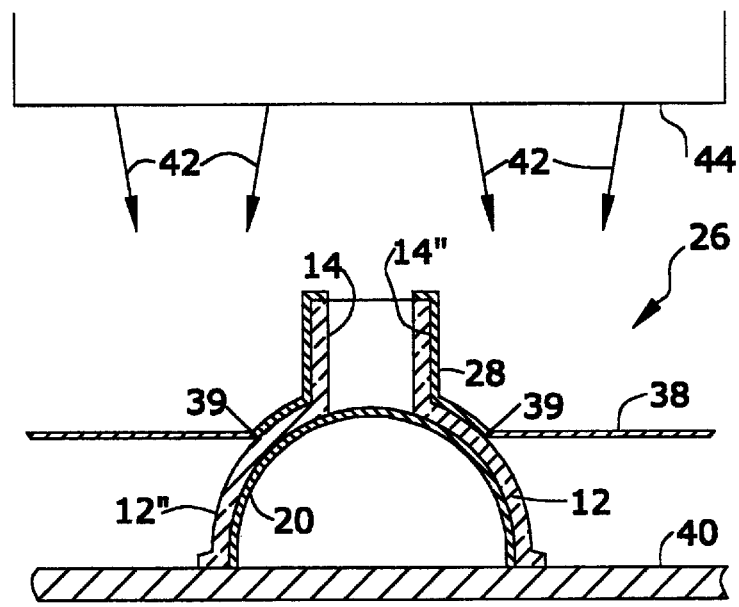
FIG. 7 is a cross-sectional, elevational view showing a first deposition technique of the invention.
Figure 8:
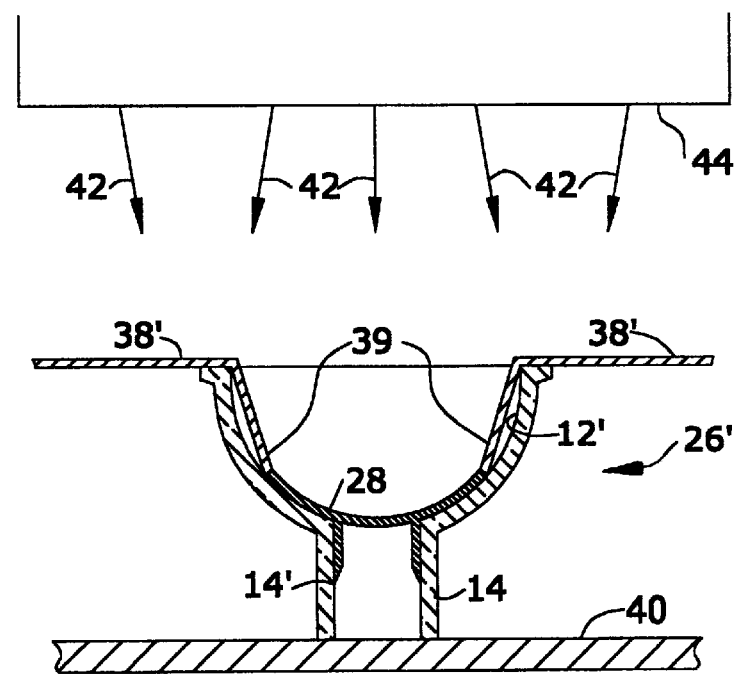
FIG. 8 is a cross-sectional, elevational view showing a second deposition technique of the invention.
Figure 9:
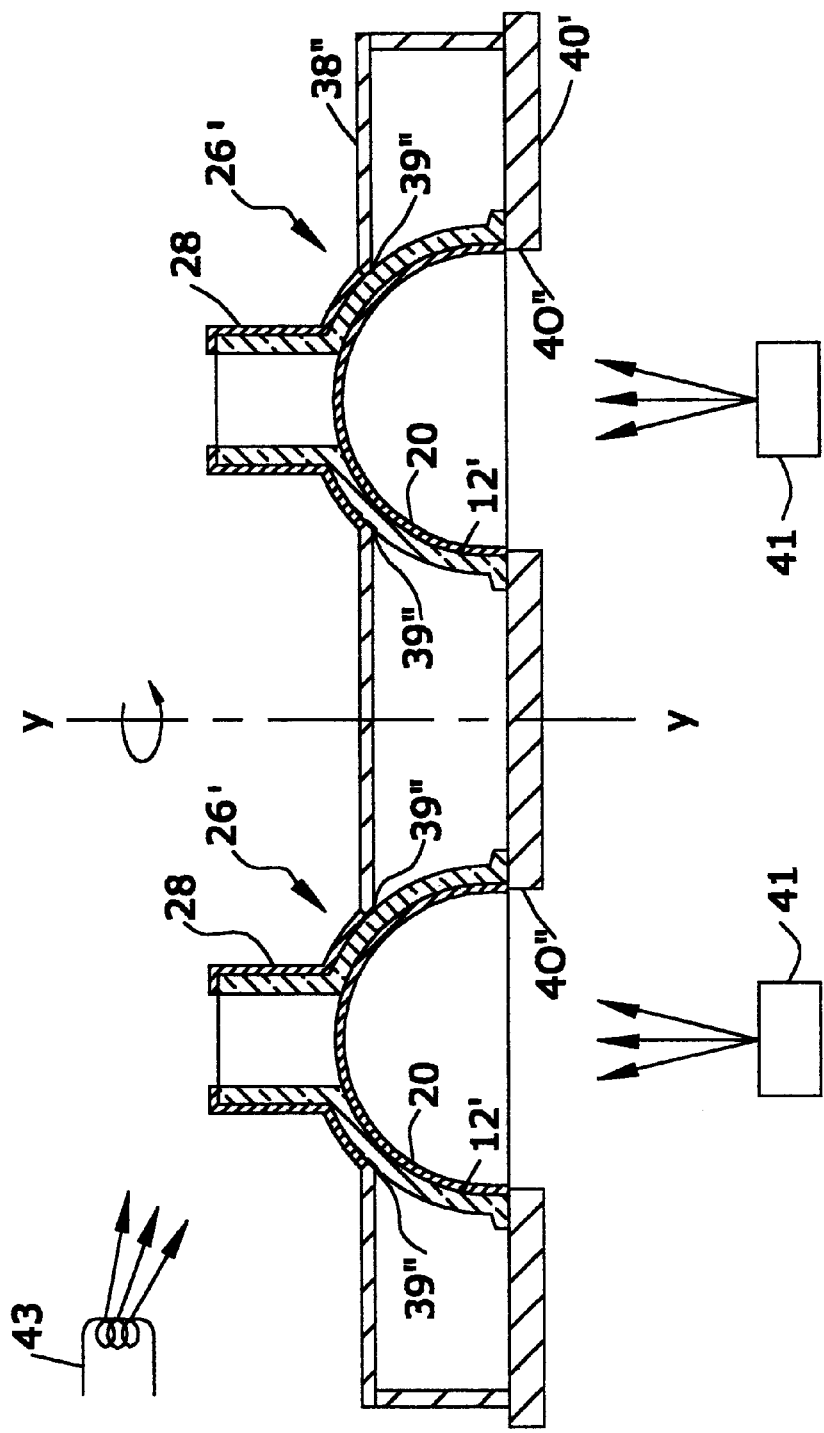
FIG. 9 is a cross-sectional, elevational -view showing a third deposition technique of the invention.

Masking may be used to ensure coating 28 is applied only where desired. FIGS. 7, 8 and 9 illustrate masking for internal (FIG. 8) and external (FIGS. 7 and 9) coatings. In each instance, the size of the area to be coated is conveniently controlled by the size of the opening in the mask. More intricate masks can be provided to deposit patterns such as that of FIG. 6. Sharpness of the coating edges can be increased by decreasing the distance between the edge of the mask and the substrate.

Referring to FIG. 7, reflector 26 is positioned dome side down on support plate 40. A mask 38 having an opening 39 is placed over reflector 26 with neck portion 14 extending through opening 39. The size of opening 39 is chosen depending on the desired size of coating 28. Interference coating 20 may be deposited either before or after deposition of second coating 28. Sputtering target 44 is positioned above reflector 26 such that material 42 is deposited on the exposed external surfaces 14" and 12" of neck 14 and dome-shaped portion 12, respectively.

Referring to FIG. 8, the internal surfaces of reflector 26' are deposited with second coating 28 using a mask 38' having downwardly extending wall portions 39. In this instance, reflector 26' is positioned neck side down on support 40 whereby material 42 is deposited on the exposed internal surfaces 12' and 14' of dome portion 12 and neck portion 14, respectively. It is noted that sputtering target 44 is preferably positioned above support 40 and reflector 26', although other arrangements are possible.

FIG. 9 illustrates a simultaneous two-sided coating method wherein multiple reflectors 26' are coated with an interference coating 20 and external surface coating 28. In this instance, support 40' is provided with spaced openings 40" over which reflectors 26' are placed dome-side down such that internal dome surfaces 12' are exposed to material emanating from sources 41 positioned beneath support 40'. Simultaneously with the deposit of interference coating 20, IR-blocking coating 28 is applied to the exposed surfaces 14" and 12" which extend upwardly through the openings 39" formed in mask 38", by material emanating from source 43. In an advantageous embodiment, support plate 40' is set rotating about axis y—y for even distribution of coating 28 on each reflector 26' (it is noted that axis y—y may be vertically or non-vertically oriented). It is understood this coating method would work equally well for coating one or more than one reflectors 26' at a time.

Other deposition techniques which could be used with the present invention include Plasma Enhanced Chemical Vapor Deposition (PECVD), flame treatment, and painting. The PECVD technique has some of the same advantages as does the sputtering technique, but is also generally more complicated, and thus less cost effective than sputtering. Flame treatment is used by some glass manufacturers to temper and polish the neck portion 14 of dome-shaped reflectors. Changing conditions of that operation slightly, such as reducing the oxygen content, would lead to inclusion of some amorphous carbon in the glass substrate. This would be an extremely cost effective way to produce an IR blocking layer.

What is claimed is:

1. In a reflector for use with a lamp secured therein, said reflector formed of a transparent substrate having interior and exterior surfaces, said reflector including a first optical interference coating applied to said interior surface, said optical interference coating operable to reflect visible light while transmitting infra-red radiation through said reflector substrate from electromagnetic energy emanating from said lamp, wherein the improvement comprises a second coating applied to a predetermined portion of at least one of said exterior and interior surfaces, said second coating being substantially nontransmissive to infra-red radiation, the reflector including a main body portion and a neck portion each having interior and exterior surfaces, said second coating being applied to at least part of one of said interior and exterior surfaces of said main body portion, and the main body portion being in the shape of a dome, and wherein said second coating is applied in concentric rings about the full circumference of said dome.

2. The reflector of claim 1 wherein said second coating is further applied to at least part of one of said interior and exterior surfaces of said neck portion.

3. The reflector of claim 2 wherein said second coating is applied to the part of said main body portion located adjacent said neck portion.

4. The reflector of claim 3 wherein said main body portion is in the shape of a dome.

5. The reflector of claim 1, wherein said reflector includes a main body portion and a neck portion each having interior and exterior surfaces, said second coating being applied to at least part of one of said interior and exterior surfaces of said neck portion.

6. The reflector of claim 1 wherein said optical interference coating is applied to said interior surface of said main body portion, and said second coating is applied to at least part of said exterior surface of said main body portion in overlying relation to said optical interference coating.

7. The reflector of claim 1 wherein said second coating is applied to at least part of said interior surface of said main body portion, and said optical interference coating is applied to substantially the entire said interior surface of said main body portion in covering relation to said second coating.

8. The reflector of claim 7 wherein said second coating is further applied to at least part of one of said interior and exterior surfaces of said neck portion.

9. The reflector of claim 8 wherein said second coating is applied to at least part of said interior surface of said neck portion.

10. The reflector of claim 1 wherein said second coating is applied to said exterior surfaces of at least part of each of said main body portion and said neck portion.

11. The reflector of claim 1 wherein said main portion is configured as a dome.

12. The reflector of claim 1 wherein said predetermined portion of said main body portion is located adjacent said neck portion.

13. The reflector of claim 1 wherein said second coating is further applied to at least part of said neck portion.

14. The reflector of claim 13 wherein said second coating is applied to said exterior surfaces of said main body portion and said neck portion.

15. The reflector of claim 1 wherein said second coating reflects substantially all IR radiation emanating from said lamp.

16. The reflector of claim 1 wherein said second coating at least partially absorbs IR radiation emanating from said lamp.

17. The reflector of claim 1 wherein said second coating is comprised of a material selected from the group consisting of:
   a) metals;
   b) semiconductors;
   c) transparent conductors;
   d) amorphous carbon;
   d) nitrides; and
   f) oxides.

18. The reflector of claim 17 wherein said second coating is comprised of at least two layers of different material.

19. In a reflector for use with a lamp secured therein, said reflector formed of a transparent substrate having interior and exterior surfaces, said reflector including a first optical interference coating applied to said interior surface, said optical interference coating being operable to reflect visible light while transmitting infra-red radiation through said reflector substrate from electromagnetic energy emanating from said lamp, wherein the improvement comprises a second coating applied to a predetermined portion of at least one of said exterior and interior surfaces, said second coating being substantially non-transmissive to infra-red radiation and wherein:
   said second coating is comprised of a material selected from the group consisting of:
      a) metals;
      b) semiconductors;
      c) transparent conductors;
      d) amorphous carbon;
      d) nitrides; and
      f) oxides;
   said second coating is comprised of at least two layers of different material; and
   said second coating is comprised of a metal and a metal nitride deposited over said metal.

20. The reflector of claim 18 wherein said second coating is comprised of a metal and a metal oxide deposited over said metal.

21. The reflector of claim 19 wherein said metal is applied to said interior surface of said reflector beneath said optical interference coating, and said metal nitride is applied to said exterior surface of said reflector in overlying relationship to said metal.

22. In a reflector for use with a lamp secured therein, said reflector formed of a transparent substrate having interior and exterior surfaces, said reflector including a first optical interference coating applied to said interior surface, said optical interference coating being operable to reflect visible light while transmitting infra-red radiation through said reflector substrate from electromagnetic energy emanating from said lamp, wherein the improvement comprises a second coating applied to a predetermined portion of at least one of said exterior and interior surfaces, said second coating being substantially nontransmissive to infra-red radiation and wherein:
   said second coating is comprised of a material selected from the group consisting of:
      a) metals;
      b) semiconductors;
      c) transparent conductors;
      d) amorphous carbon;
      d) nitrides; and
      f) oxides;
   said second coating is comprised of at least two layers of different material;
   said second coating is comprised of a metal and a metal oxide deposited over said metal; and
   said metal is applied to said interior surface of said reflector beneath said optical interference coating, and said metal oxide is applied to said exterior surface of said reflector in overlying relationship to said metal.

23. The reflector of claim 19 wherein said metal nitride is applied to said interior surface of said reflector and said metal is applied over said metal nitride beneath said optical interference coating.

24. In a reflector for use with a lamp secured therein, said reflector formed of a transparent substrate having interior and exterior surfaces, said reflector including a first optical interference coating applied to said interior surface, said optical interference coating being operable to reflect visible light while transmitting infra-red radiation through said reflector substrate from electromagnetic energy emanating from said lamp, wherein the improvement comprises a second coating applied to a predetermined portion of at least one of said exterior and interior surfaces, said second coating being substantially nontransmissive to infra-red radiation and wherein:
   said second coating is comprised of a material selected from the group consisting of:
      a) metals;
      b) semiconductors;
      c) transparent conductors;
      d) amorphous carbon;
      d) nitrides; and
      f) oxides;
   said second coating is comprised of at least two layers of different material;
   said second coating is comprised of a metal and a metal oxide deposited over said metal; and
   said metal oxide is applied to said interior surface of said reflector, and said metal is applied over said metal oxide beneath said optical interference coating.

25. The reflector of claim 1 wherein said second coating is applied by sputtering.

26. The reflector of claim 19 wherein said metal is Al, and said metal nitride is TiN.

27. The reflector of claim 19 wherein said metal is Ti, and said metal nitride is TiN.

28. The reflector of claim 19 wherein said metal is Cr, and said metal nitride is CrN.

29. The reflector of claim 27 wherein said metal and said metal nitride are applied to said reflector in one continuous process.

30. The reflector of claim 28 wherein said metal and said metal nitride are applied to said reflector in one continuous process.

31. The reflector of claim 29 wherein said process is sputtering.

32. The reflector of claim 30 wherein said process is sputtering.

33. A method of making a reflector having a predetermined IR reflectance/transmittance ratio, said reflector having a main body portion having interior and exterior surfaces, said method comprising the steps of:
   a) applying a first coating comprising an optical interference coating comprising multiple layers of materials having alternating high and low indices of refraction to a first portion of said reflector; and
   b) applying a second coating to a second portion of said reflector, said second coating being substantially nontransmissive to IR radiation and including at least two layers of different materials including a first material and a second material, and the step of applying includes the steps of:
      b1) applying the first material beneath the first coating; and
      b2) applying the second material to one of the interior surface and the exterior surface of the reflector in overlying relationship to the first material.

34. The method of claim 33, wherein said reflector includes a dome-shaped portion and a neck portion wherein a lamp is secured, and wherein said optical interference coating is applied to said dome-shaped portion and said second coating is applied to at least part of said neck portion.

35. The method of claim 33 wherein said reflector includes a dome-shaped portion and a neck portion wherein a lamp is secured, and wherein said first coating is applied to said dome-shaped portion and said second coating is applied to a portion of said dome shaped portion located adjacent said neck portion.

36. The method of claim 35 wherein said second coating is applied to said interior surface of said reflector, and said first coating is applied over said second coating.

37. The method of claim 33 wherein said first coating is applied to said interior surface and said second coating is applied to said exterior surface.

38. In a reflector for use with a lamp secured therein, the reflector formed of a transparent substrate having interior and exterior surfaces, the reflector including a first optical interference coating applied to the interior surface, the optical interference coating being operable to reflect visible light while transmitting infra-red radiation through the reflector substrate from electromagnetic energy emanating from the lamp, the reflector further including a main body portion, the improvement comprising a second coating applied to a predetermined portion of at least one of said exterior and interior surfaces, said second coating being substantially nontransmissive to infra-red radiation, said second coating being applied to at least part of one of said interior and exterior surfaces on the main body portion in concentric rings about a full circumference of the main body portion.

39. In a reflector for use with a lamp secured therein, said reflector formed of a transparent substrate having interior and exterior surfaces, said reflector including a first optical interference coating applied to said interior surface, said optical interference coating being operable to reflect visible light while transmitting infra-red radiation through said reflector substrate from electromagnetic energy emanating from the lamp, wherein the improvement comprises a second coating applied to a predetermined portion of at least one of said exterior and interior surfaces, said second coating being substantially nontransmissive to infra-red radiation and being comprised of at least two layers of different material, one of the at least two layers being comprised of a metal and another of the at least two layers being one of a metal nitride and a metal oxide deposited over said metal.

40. In a reflector for use with a lamp secured therein, said reflector formed of a transparent substrate having interior and exterior surfaces, said reflector including a first optical interference coating applied to said interior surface, said optical interference coating being operable to reflect visible light while transmitting infra-red radiation through said reflector substrate from electromagnetic energy emanating from the lamp, wherein the improvement comprises a second coating applied to a predetermined portion of at least open of said exterior and interior surfaces, said second coating being substantially nontransmissive to infra-red radiation and being comprised of at least two layers of different material including a first material and a second material, the first material being applied beneath the optical interference coating, and the second material being applied to one of the interior and the exterior surface of the reflector in overlying relationship to the first material.

41. The reflector of claim 40 wherein the first material is a metal and the second material is of a metal nitride and a metal oxide deposited over said metal, the metal being applied beneath the optical interference coating, and the metal oxide being applied to one of the interior and the exterior surface of the reflector in overlying relationship to the metal.

42. The method of claim 33 wherein the first material is a metal and the second material is a metal oxide.

43. A method of making a reflector having a predetermined IR reflectance/transmittance ratio, said reflector having a main body portion having interior and exterior surfaces, said method comprising the steps of:
   a) applying a first coating comprising an optical interference coating that includes multiple layers of materials having alternating high and low indices of refraction to a first portion of said reflector; and
   b) applying a second coating to a second portion of said reflector in concentric rings, said second coating being substantially nontransmissive to IR radiation.

* * * * *